(12) United States Patent
Biswas et al.

(10) Patent No.: US 8,819,840 B2
(45) Date of Patent: Aug. 26, 2014

(54) METHOD AND APPARATUS FOR PROVISIONING SUBSCRIPTION PRODUCTS

(75) Inventors: Sanjeev Kumar Biswas, Bangalore (IN); Daniel Carl Brotsky, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 88 days.

(21) Appl. No.: 13/589,496

(22) Filed: Aug. 20, 2012

(65) Prior Publication Data

US 2014/0053277 A1 Feb. 20, 2014

(51) Int. Cl.
*G06F 21/60* (2013.01)

(52) U.S. Cl.
USPC .............. 726/26; 726/27; 726/31; 726/32; 705/51; 705/57; 705/59

(58) Field of Classification Search
None
See application file for complete search history.

(56) References Cited

U.S. PATENT DOCUMENTS

| | | | |
|---|---|---|---|
| 2005/0131833 A1* | 6/2005 | Martinelli et al. | 705/59 |
| 2007/0027815 A1* | 2/2007 | Sobel et al. | 705/59 |
| 2008/0262968 A1* | 10/2008 | Saxena et al. | 705/51 |
| 2008/0275993 A1* | 11/2008 | Mohammed et al. | 709/228 |
| 2009/0119779 A1* | 5/2009 | Dean et al. | 726/26 |
| 2010/0293536 A1* | 11/2010 | Nikitin et al. | 717/168 |
| 2012/0144457 A1* | 6/2012 | Counterman | 726/5 |

OTHER PUBLICATIONS

Mary Jo Foley, Microsoft Office 365: A guide to coming plans and prices, Mar. 25, 2011, ZDNet, retrieved from http://www.zdnet.com/blog/microsoft/.*

* cited by examiner

*Primary Examiner* — Jung Kim
*Assistant Examiner* — Adrian Stoica
(74) *Attorney, Agent, or Firm* — Moser Taboada (57) ABSTRACT

A method and apparatus for provisioning a subscription product is disclosed. The method comprises receiving a request for a subscription product; retrieving a profile and at least one subscription associated with the profile, wherein the at least one subscription comprises a plurality of subscription details; validating the plurality of subscription details; retrieving product data for the subscription product based on the validated subscription details; determining a dominant subscription product when there are at least two subscriptions associated with the profile; and sending the product data for the dominant subscription product, wherein the product data enables activation of a product license.

20 Claims, 3 Drawing Sheets

METHOD AND APPARATUS FOR PROVISIONING SUBSCRIPTION PRODUCTS

BACKGROUND OF THE INVENTION

1. Field of the Invention

Embodiments of the present invention generally relate to software provisioning, and more particularly, to a method and apparatus for provisioning subscription products.

2. Description of the Related Art

Provisioning is a process of preparing and equipping a product to allow it to provide new or updated services to a user entitled to have access to the product. A software subscription product is a product in which a user pays a subscription price in order to have access to the product for a specified duration or term, which term is generally renewable, but may be for an unlimited term. When a user purchases a software subscription product, the user typically enters a subscription serial number in order to gain access to the product. Software providers release new subscription applications and upgrades for access by entitled users. For example, an ADOBE® CREATIVE SUITE® 5.5 Suite subscription users may update to an ADOBE® CREATIVE SUITE® 6 Master Collection subscription or an ADOBE® CREATIVE CLOUD® subscription. Alternatively, an ADOBE® CREATIVE SUITE® 6 Photoshop subscription user may update to an ADOBE® CREATIVE CLOUD® subscription.

Currently, in order to use a subscription product, a user must first register with a subscription provider and then enter a subscription serial number. The subscription serial number defines the user's entitlements for a specific product. The entitlements for a product are typically stored on the subscription provider's server as an object in a database. The subscription provider uses subscription object information in the database to auto-renew subscriptions. For example, a subscription object may contain information about the product to which a user is entitled and terms of the subscription. When a user wishes to upgrade to a newer version of a subscription product, the user must re-enter the subscription serial number the user received when the original subscription product was purchased. Unfortunately, a subscription serial number may be misplaced by the user or stolen and used by an unauthorized user.

One solution is to issue new subscription serial numbers for product upgrades. However, the original product from which the subscription was upgraded would stop working because the original product is still associated with the previous subscription serial number. Also, auto-renewal of subscriptions would no longer work because the new subscription object in the subscription provider's database would override any older version of the subscription object. Updating the old subscription objects on the subscription provider's database is not feasible as the number of subscription objects would increase with each release or upgrade and managing them would soon become a formidable challenge.

Therefore, there is a need for a method and apparatus for provisioning subscription products.

SUMMARY OF THE INVENTION

Embodiments of the invention generally relate to a method and apparatus for provisioning subscription products. The method and apparatus comprise receiving a request for a subscription product. The method and apparatus retrieve a profile and at least one subscription associated with the profile, wherein the at least one subscription comprises a plurality of subscription details. The method and apparatus validate the plurality of subscription details and retrieve product data for the subscription product based on the validated subscription details. After determining a dominant subscription product if there are at least two subscriptions associated with the profile; the method and apparatus send the product data for the dominant subscription product, wherein the product data enables activation of a product license.

While the method and apparatus is described herein by way of example for several embodiments and illustrative drawings, those skilled in the art will recognize that the method and apparatus for provisioning subscription products are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for provisioning subscription products as defined by the appended claims. Any headings used herein are for organizational purposes only and are not meant to limit the scope of the description or the claims. As used herein, the word "software" are used in a general sense to mean any software subscription product that provides a user access to the product. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for provisioning subscription products. Embodiments of the invention enable a user to sign-in to a subscription provider and use their new or upgraded subscription product.

In one embodiment source provisioning table is stored on a subscription provider's server. The source provisioning table includes information that defines each subscription product and entitlements that are available to users for each subscription product. An entitlement is analogous to a user license. Thus, the source provisioning table includes a provisioning/renewal stock keeping unit (SKU), a serial number SKU, a numeric product version, and an installer scenario key for each subscription product. The provisioning/renewal SKU is a subscription SKU identifier for a product. Each SKU may have multiple serial number SKUs, for example, ADOBE® PHOTOSHOP® English will have a different serial number SKU than ADOBE® PHOTOSHOP® German, but both will have the same provisioning/renewal SKU. The numeric product version is an identifier that describes the version of the serial number SKU. The installer scenario key is a combination of three pieces of information for a given serial number SKU.

The installer scenario key comprises (1) a product ID, (2) an identifier that describes the platform on which the product may be run, and (3) an installer code that identifies product information such as whether the product is a subscription product, whether the product is sold in an individualized manner via retail or packaged for wholesale distribution in conjunction with a high volume product, in what region of the world the product is intended for sale, what languages the product allows for use, and the like.

When a user purchases a subscription product, a service account object (SAO) is created for the user and stored in a user profile. The SAO contains subscription details for a given subscription. If a user has subscriptions to multiple products, the user profile will contain an SAO for each subscription. The SAO is created using the subscription provisioning/renewal SKU of the subscription product purchased by the user. The provisioning/renewal SKU is looked up in the source provisioning table, and the serial number SKU, numeric product version and installer scenario key are retrieved from the source provisioning table and stored in the SAO in a user profile.

When a user wants to activate a new subscription, for example, from an ADOBE® CREATIVE SUITE® 5.5 Suite subscription to an ADOBE® CREATIVE SUITE® 6 Master Collection subscription or an ADOBE® CREATIVE CLOUD® subscription, an application manager on the client computer sends a request from the client computer to an entitlement service module. The request includes user information and product information. The entitlement service module uses the user information sent with the request to retrieve a user profile including the user's SAO details. The entitlement service module retrieves the installer scenario key, serial number, and version of the upgraded subscription from the SAO details.

A validation service module validates the installer scenario key by comparing the installer scenario key to a list of created installer scenario keys. If the installer scenario key is found to be valid, the installer scenario key is used as an index into a scenario table to retrieve product data. As described previously, product data includes information about how the serialized product should behave, such as whether the product is a subscription, on what platform the product runs, whether the product is sold in an individualized manner via retail or packaged for wholesale distribution in conjunction with a high volume product, what region of the world the product is intended for sale, what languages the product allows for use, and the like. Dominance information is also retrieved from the scenario table. When a user profile includes more than one subscription for a product, dominance information defines which product subscription is dominant, meaning which subscription encompasses more subscription products. For example, ADOBE® CREATIVE SUITE® Master Collection includes ADOBE® PHOTOSHOP®, ADOBE® ILLUSTRATOR®, ADOBE® INDESIGN®, ADOBE® ACROBAT®, ADOBE® DREAMWEAVER®, and many more subscription products. Suppose, for example, ADOBE® CREATIVE SUITE® Design Standard includes ADOBE® PHOTOSHOP®, ADOBE® ILLUSTRATOR®, ADOBE® INDESIGN®, and ADOBE® ACROBAT®. The subscription product that encompasses more products, in the present example, ADOBE® CREATIVE SUITE® Master Collection, dominates a product containing fewer products, namely ADOBE® CREATIVE SUITE® Design Standard. The retrieved dominance information from the scenario table determines what products are licensed for the user. In the present example, defining ADOBE® CREATIVE SUITE® Master Collection as the dominant subscription entitles the user to activate a license for all subscription products under the ADOBE® CREATIVE SUITE® Master Collection. However, if ADOBE® CREATIVE SUITE® Design Standard were defined as the dominant subscription, the user would be entitled to activate a license for the products ADOBE® PHOTOSHOP®, ADOBE® ILLUSTRATOR®, ADOBE® INDESIGN®, and ADOBE® ACROBAT®.

The serial number for the dominant subscription product and the product data retrieved from the scenario table are sent to the client computer. An application manager on the client computer uses a product id from the returned product data to determine the correct licensing configuration file from which it will load a local license. The application manager then deletes any local license present on the client computer that is associated with the serial number. The deletion is performed in order to reload a new license containing new features if any. For example, a local license for an ADOBE® CREATIVE SUITE® 5.5 Suite will not contain the features of ADOBE® CREATIVE SUITE® 6. The application manager loads and activates the new license, thereby allowing the client computer user access to the product (and any new features in the case of an upgrade). The serial number does not need to be entered by the client computer user thereby relieving the user of keeping track of or risking misplacement of the serial number.

Various embodiments of an apparatus and method for provisioning subscription products are described. In the following detailed description, numerous specific details are set forth to provide a thorough understanding of the claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
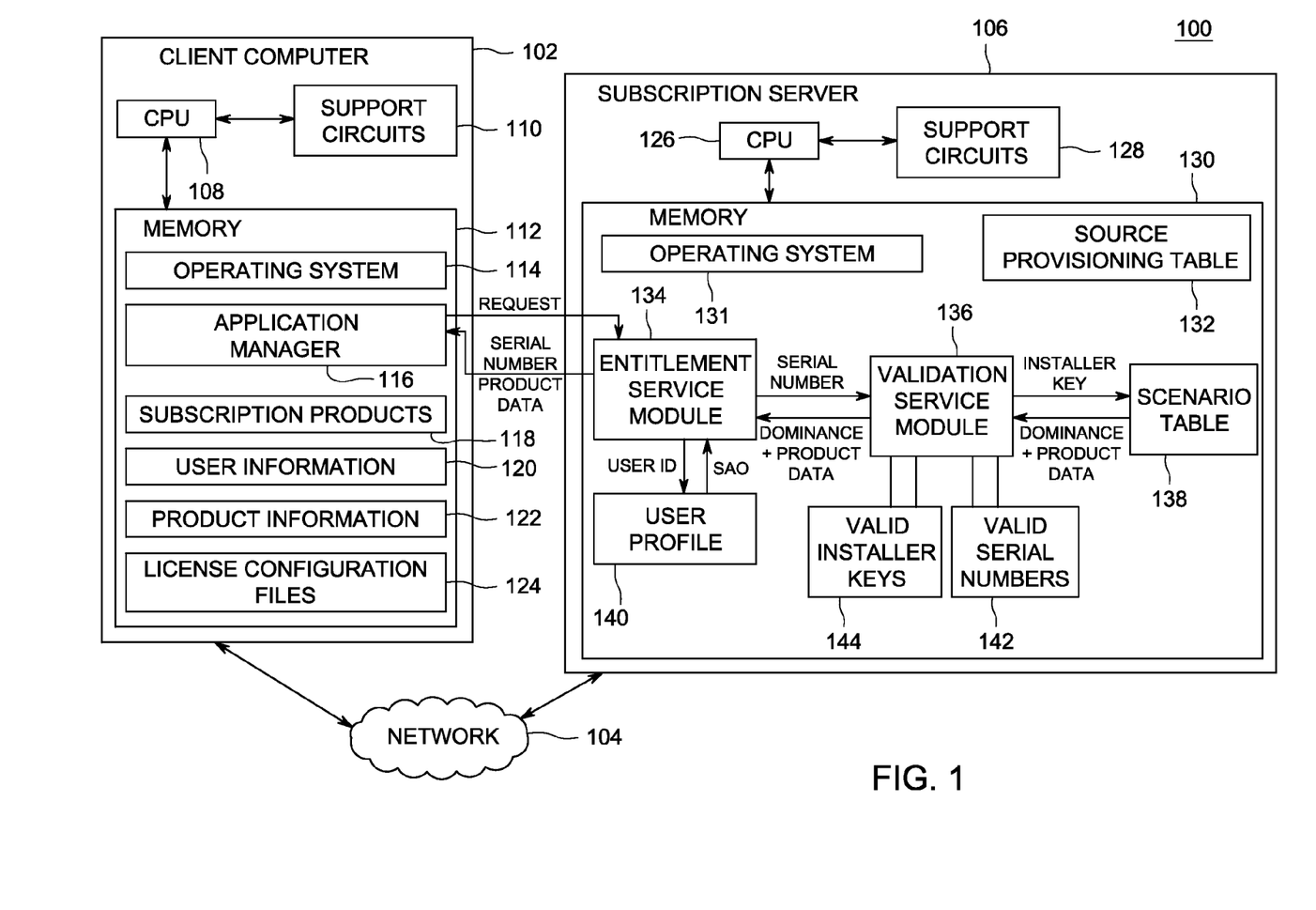
FIG. 1 depicts a block diagram of a system for provisioning subscription products, according to one or more embodiments of the invention.

FIG. 1 depicts a block diagram of a system 100 for provisioning subscription products, according to one or more embodiments of the invention. The system 100 comprises a client computer 102, and a subscription server 106 connected to each other through a network 104. In some embodiments, the client computer 102 is a type of user computing device (e.g., a laptop, a desktop and/or the like) running various applications, such as ADOBE® CREATIVE SUITE® 5.5 Suite or ADOBE® CREATIVE SUITE® 6.0 subscription. The client computer 102 comprises a CPU 104, support circuits 106 and a memory 108. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises an operating system 114, an application manager 116, a subscription product 118, user information 120, product information 122, and license configuration files 124.

According to some embodiments of the invention, the operating system (OS) 114 generally manages various computer resources (e.g., network resources, file processors, and/or the like). The operating system 114 is configured to execute operations on one or more hardware and/or software modules, such as Network Interface Cards (NICs), hard disks, virtualization layers, firewalls and/or the like. Examples of the operating system 114 may include, but are not limited to, Linux, Mac OSX, BSD, Unix, Microsoft Windows, and the like.

The application manager 116 manages the downloading and provisioning of software products. The application manager 116 may be any download manager, such as an ADOBE® Application Manager, or any manager capable of managing software downloads and activating subscription licenses. The subscription product 118 may be any software subscription product such as an ADOBE® CREATIVE SUITE® 5.5 Suite, ADOBE® CREATIVE SUITE® 6, ADOBE® CREATIVE CLOUD® membership, or any software product provided to a user via a subscription. The subscription product 118 may be a new application or update of an existing application made available by a subscription provider.

The license configuration files 124 comprise licensing information for the various subscription products 118 installed on the client computer 102. The user information 120 may include login information that provides access to a subscription server 106 and a user identification number that is associated with the subscriptions of the subscription user. The product information 122 links a subscription product 118 to an appropriate license configuration file 124.

The subscription server 106 is a type of computing device (e.g., a laptop, a desktop, a Personal Digital Assistant (PDA) and/or the like). The subscription server 106 comprises a CPU 126, support circuits 128 and a memory 130. The CPU 126 may comprise one or more commercially available microprocessors or microcontrollers that facilitate data processing and storage. The various support circuits 128 facilitate the operation of the CPU 126 and include one or more clock circuits, power supplies, cache, input/output circuits, displays, and the like. The memory 130 comprises at least one of Read Only Memory (ROM), Random Access Memory (RAM), disk drive storage, optical storage, removable storage and/or the like. The memory 130 comprises an operating system 131, a source provision table 132, an entitlement service module 134, a validation service module 136, a scenario table 138, a file of user profiles 140, a file of valid serial numbers 142, and a file of valid installer scenario keys 144. The user profiles 140, valid serial numbers 142 and valid installer scenario keys 144 may be stored on the subscription server 106 or stored remotely (not shown).

The network 104 comprises a communication system that connects computers by wire, cable, fiber optic and/or wireless link facilitated by various types of well-known network elements, such as hubs, switches, routers, and the like. The network 104 may employ various well-known protocols to communicate information amongst the network resources. For example, the network 104 may be a part of the Internet or Intranet using various communications infrastructure, such as Ethernet, Wi-Fi, Wi-Max, General Packet Radio Service (GPRS), and the like.

The application manager 116 provisions subscription products on the client computer 102. When a user of the client computer 102 chooses to purchase or upgrade a subscription product 118, for example, to upgrade from an ADOBE® CREATIVE SUITE® 5.5 Suite subscription to an ADOBE® CREATIVE SUITE® 6 Production Premium subscription or an ADOBE® CREATIVE CLOUD® subscription, the application manager 116 sends a request from the client computer 102 to the entitlement service module 134 on the subscription server 106. The entitlement service module 134 uses a user ID provided in the request to retrieve a user profile including the user's service account object (SAO) details from user profiles 140. If a user profile does not exist for the user, the user creates an account and an SAO is created using a redemption code provided in the request. The SAO is an array of subscriptions stored in the user profile 140. An SAO exists for each subscription held by the user. The SAO includes subscription information regarding a user's entitlements for a subscription product 118. Each SAO includes a provisioning/renewal SKU for the subscription product 118, a serial number SKU for the subscription product 118, a numeric product version of the subscription product 118, and an installer scenario key for the subscription product, as described above. If the user does not have an SAO, meaning the request is for a new rather than upgraded subscription, an SAO is created for the user using information provided in the source provision table 132 as described above. The entitlement service module 134 retrieves the installer scenario key, serial number, and version from the SAO parameters in each SAO of the user profile 140.

A validation service module 136 is responsive to the data retrieved by the entitlement service module 134 to validate the installer scenario key. The installer scenario key must exist in the file of valid installer keys 144. If the installer scenario key is not found in the SAO, for example in the instance where the subscription was provisioned prior to implementation of installer scenario keys, the serial number will be used for validation by verifying the serial number exists in a file of valid serial numbers 142, and if the serial number is valid an installer scenario key is generated. If the installer key (or serial number) is found to be valid, the installer scenario key is used as an index into a scenario table 138 to retrieve product data. As described previously, product data includes information about how the product should behave, such as whether the product is a subscription, on what platform the product runs, whether the product is sold in retail or volume, what region of the world the product is intended for sale, what languages the product allows for use, and the like.

Dominance information is also retrieved from the scenario table 138. When a user profile includes more than one subscription for a product, dominance information defines which product subscription is dominant, meaning which subscription encompasses more subscription products. For example, ADOBE® CREATIVE SUITE® Master Collection includes ADOBE® PHOTOSHOP®, ADOBE® ILLUSTRATOR®, ADOBE® INDESIGN®, ADOBE® ACROBAT®, ADOBE® DREAMWEAVER®, and many more subscription products. Suppose, for example, ADOBE® CREATIVE SUITE® Design Standard includes ADOBE® PHOTOSHOP®, ADOBE® ILLUSTRATOR®, ADOBE® INDESIGN®, and ADOBE® ACROBAT®. The subscription product that encompasses more products, in the present example, ADOBE® CREATIVE SUITE® Master Collection, dominates a product containing fewer products, namely ADOBE® CREATIVE SUITE® Design Standard. The retrieved information determines what products are licensed for the client computer. In the present example, defining ADOBE® CREATIVE SUITE® Master Collection as the dominant subscription entitles a user to activate a license for all subscription products under the ADOBE® CREATIVE SUITE® Master Collection. However, if ADOBE® CREATIVE SUITE® Design Standard were defined as the dominant subscription, the user would entitle the user to activate a license for the products ADOBE® PHOTOSHOP®, ADOBE® ILLUSTRATOR®, ADOBE® INDESIGN®, and ADOBE® ACROBAT®.

The serial number of the dominant subscription and the product data for the dominant product retrieved from scenario table 138 are sent to the client computer 102. The application manager 116 on the client computer 102 looks up a product id from the product data in the product information 122 to determine the correct licensing configuration file 124 from which the application manager 116 will load a local license. The application manager 116 then deletes any local license present on the client computer 102 for the serial number and reloads and activates a new license.

Figure 2:
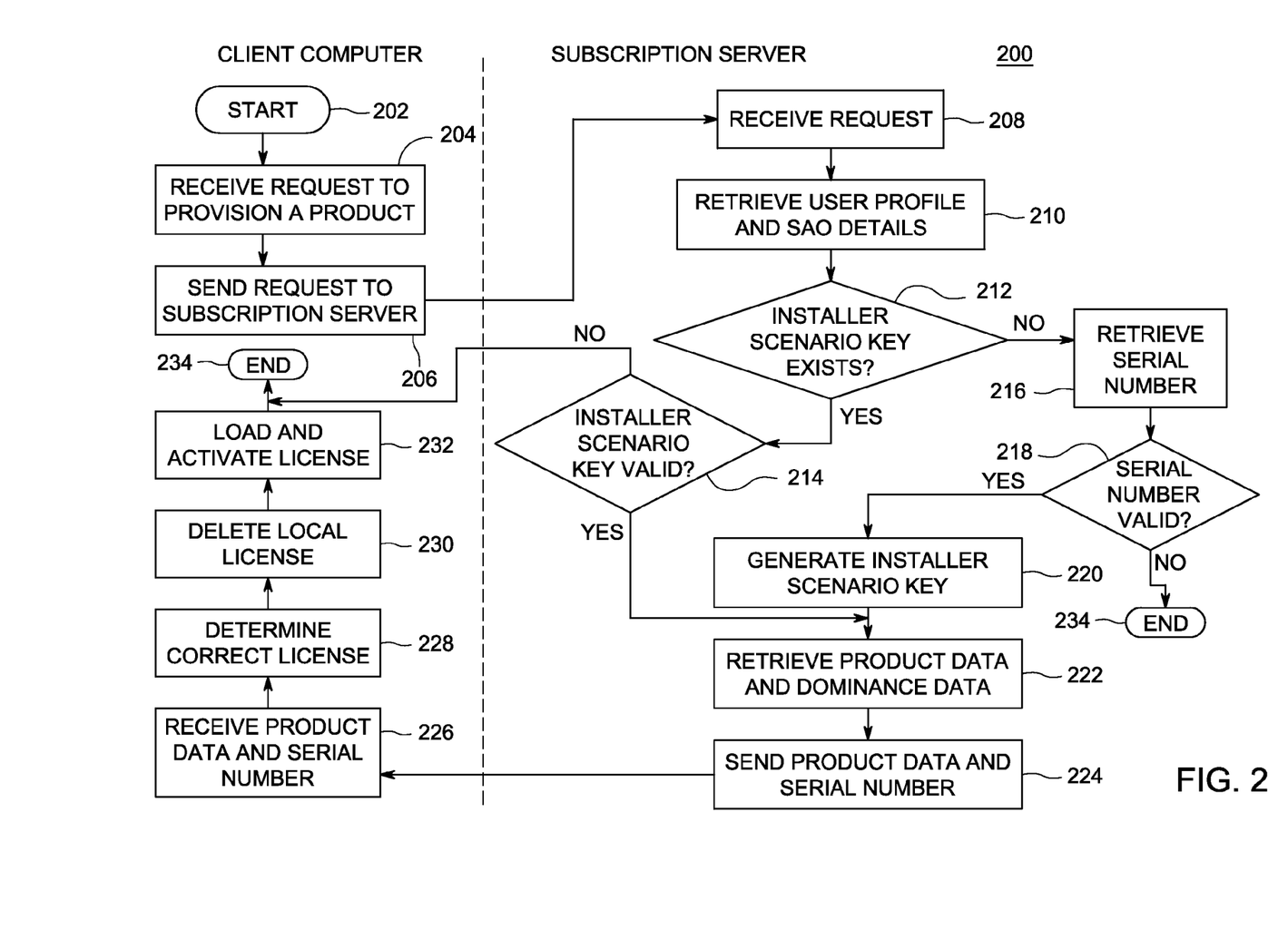
FIG. 2 depicts a flow diagram of a method for provisioning subscription products as performed by the application manager, the entitlement service module, and the validation service module of the system of FIG. 1, according to one or more embodiments of the invention.

FIG. 2 depicts a flow diagram of a method 200 for provisioning subscription products as performed by the application manager 116, the entitlement service module 134, and the validation service module 136 of the system 100 of FIG. 1, according to one or more embodiments of the invention.

The method 200 starts at step 202 and proceeds to step 204. At step 204, the method 200 receives a request to provision a product. The product may be a new product for installation or the product may be an upgrade to a new version of an existing subscription product. The method 200 proceeds to step 206, where the method 200 facilitates sending the request from a client computer to a subscription server. The method 200 includes user information and product information in the request. The user information comprises a user identification number (user ID). The product information comprises a licensing identification number for the product. The method 200 proceeds to step 208.

At step 208, the method 200 receives the request on the server. The method 200 proceeds to step 210, where the method 200 retrieves a user profile. The user profile is retrieved using the user ID. The method 200 also retrieves any service account objects (SAOs) for the user. The user will have a SAO for each subscription product to which the user is entitled. The SAO includes information about the user's entitlements for each subscription product. An SAO may be, for example:

{"ident":"103419112915446026569831","serviceCode":"cs_dse_2", "serviceStatus":"ACTIVE","serviceLevel":"CS_LVL_1", "ownerGuid":"012A3C184F14027D0A490D25","ownerAuthSrc": "WCD","delegateGuid":"012A3C184F14027D0A490D25", "delegateAuthSrc":"WCD","subRef":"1034-1911-2915-4460-2656-9831","createDts":1326715584000,"modDts":1326715584000, "effectiveEndDts":1329319799000,"params":[{"pn": "dtsm_lf_ttl_start","pv":"432000"}, {"pn":"dtsm_lf_ttl_grace", "pv":"432000"},{"pn":"DSP_PRODUCT_VERSION ","pv":"1.0"},{"pn":"DSP_SCENARIO_KEY", "pv":"12345566"}]}, In this example, DSP_SCENARIO_KEY is the installer scenario key described above and DSP_PRODUCT_VERSION is the product version of the subscription product. The installer scenario key will be validated before a subscription product is provisioned. If the DSP_SCENARIO_KEY is absent in the SAO, which may occur if the SAO was provisioned before the use of a scenario key, the serial number found for example, in the "ident" field, will be used for validation. The method 200 proceeds to step 212, where the method 200 determines whether an installer scenario key exists in the SAO. If the installer scenario key exists in the SAO, the method 200 proceeds to step 214, where the method 200 determines whether the installer scenario key is valid. The installer scenario key is valid if the installer scenario key exists in a file of valid installer keys. If the installer scenario key is invalid, the method 200 proceeds to step 234 and ends. However, if the installer scenario key is valid, the method 200 proceeds to step 222.

If at step 212, the method 200 determined that an installer scenario key does not exist in the SAO, the method 200 proceeds to step 216, where the method 200 retrieves a serial number for the subscription product from the SAO. In the example SAO above, the serial number is found in the "ident" field. The method 200 proceeds to step 218, where the method 200 determines whether the serial number is valid. The serial number is valid if the serial number exists in a file of valid serial numbers. If the serial number is invalid, the method 200 proceeds to step 234 and ends. However, if the serial number is valid, the method 200 proceeds to step 220, where an installer scenario key is generated by concatenating a product ID, an identifier that describes the platform on which the product may be run, and an installer code as described above. The method 200 proceeds to step 222.

At step 222, the method 200 retrieves product and dominance data from a scenario table. The installer scenario key is used as an index into the scenario table to retrieve the product and dominance data. The product data includes information about how the product should behave, such as whether the product is a subscription, whether the product is sold in retail or volume, what region of the world the product is intended for sale, what languages the product allows for use, and the like. Dominance information is also retrieved from the scenario table. Dominance refers to the user subscription that encompasses the most subscription products therein. For example, a subscription product that includes a number of products, such as ADOBE® CREATIVE SUITE® Master Collection dominates any single product that could be contained therein, such as ADOBE® PHOTOSHOP® or ADOBE® AFTER EFFECTS®. The retrieved dominance information determines what subscription products are licensed for the client computer. Because in the present example, the ADOBE® CREATIVE SUITE® Master Collection is dominant, the license for the ADOBE® CREATIVE SUITE® Master Collection is provisioned, rather than provisioning a license for simply ADOBE® PHOTOSHOP®. The method 200 proceeds to step 224.

At step 224, the method 200 facilitates sending the serial number of the dominant subscription product and the product data to the client computer. The method 200 proceeds to step 226, where the method 200 receives the serial number and product data on the client computer. The method 200 proceeds to step 228 where the method 200 determines a correct license that is to be activated for the subscription product. The method 200 looks up a product ID provided in the product data in a product information file. The product ID in the product information file is associated with a license configuration file that will be activated to provision the subscription. The method 200 proceeds to step 230 where the method 200 deletes a local license for the serial number that was received from the subscription server, if one exists. The method 200 proceeds to step 232, where the license configuration file found in the product information file that was associated with the product ID is loaded and the license activated. The method 200 proceeds to step 234 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 3:
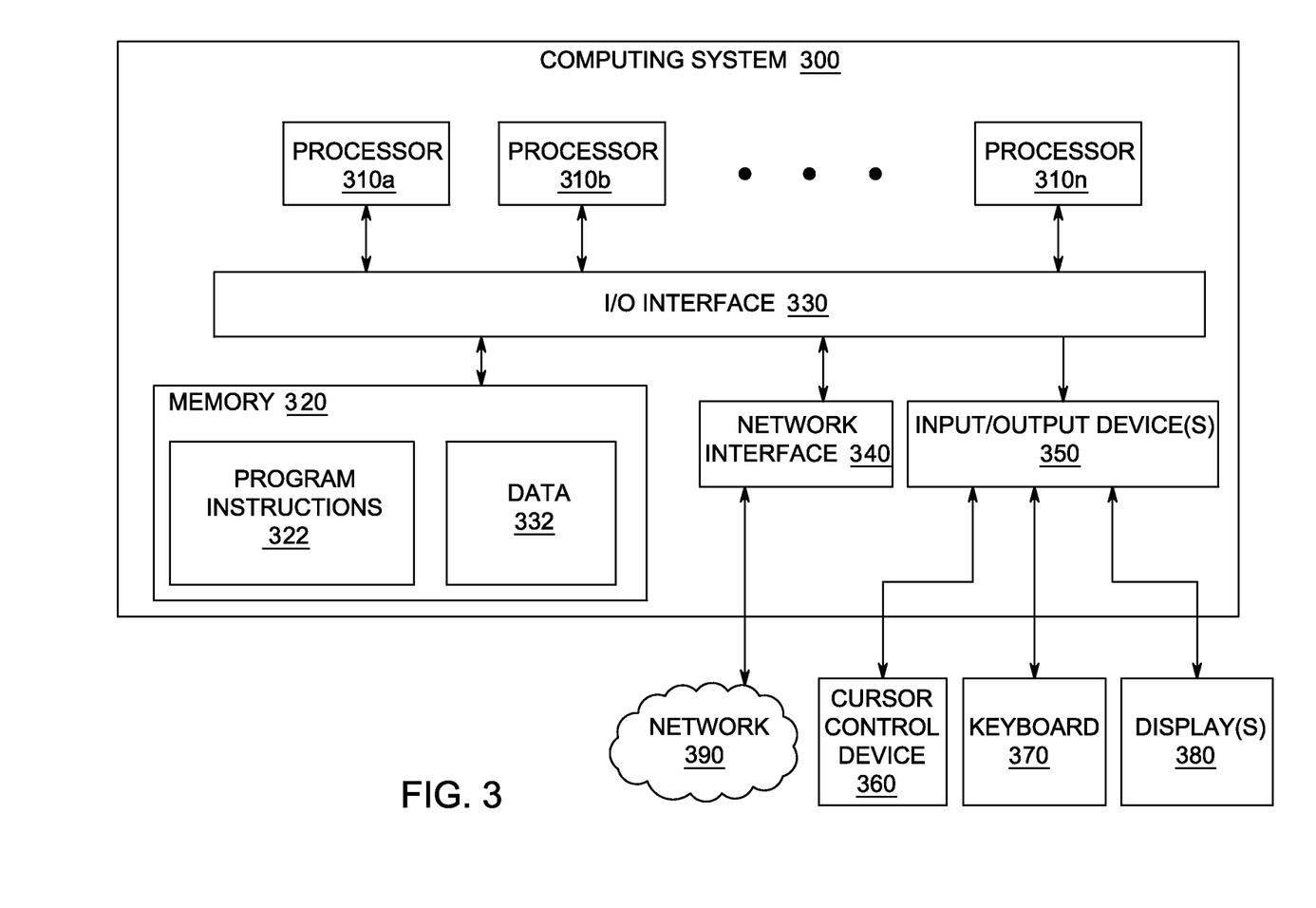
FIG. 3 depicts a computer system that can be utilized in various embodiments of the present invention, according to one or more embodiments of the invention.

FIG. 3 depicts a computer system that can be used to implement the method of FIG. 2 in various embodiments of the present invention, according to one or more embodiments of the invention.

Various embodiments of method and apparatus for provisioning subscription products, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable executable program instructions 322 (e.g., program instructions executable by processor(s) 310) in various embodiments.

In the illustrated embodiment, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one components (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touch pads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
   receiving, by a processor, a request for a license to access a first subscription product;
   retrieving, by the processor, a user profile and at least two subscriptions associated with the user profile, wherein each of the at least two subscriptions one subscription comprises a plurality of subscription details;
   validating, by the processor, the plurality of subscription details;
   retrieving, by the processor, product data for the first subscription product based on the validated subscription details;
   determining, by the processor, a dominant subscription product of the at least two subscriptions associated with the user profile, wherein a second subscription product comprises a plurality of subscription products of which the first subscription product is one of the plurality of subscription products; and
   sending, by the processor, the product data for the dominant subscription product, wherein the product data enables activation of a product license, where the product license enables access to the first subscription product in addition to the plurality of subscription products in the second subscription product.

2. The method of claim 1, wherein the request comprises at least one of installing a new subscription product or upgrading an existing subscription product.

3. The method of claim 1 wherein the request comprises a product license identification code and a user identification code.

4. The method of claim 2 wherein the subscription details comprise an installer scenario key.

5. The method of claim 4, wherein the installer scenario key defines a subscription product, a platform on which the subscription product will run, and a serial number.

6. The method of claim 5, wherein the serial number and defined subscription product define a license that is to be activated on a client computer.

7. The method of claim 1, wherein determining a dominant subscription product comprises determining which of two or more subscription products includes a greater number of subscription products, wherein the subscription product that includes the greater number of subscription products includes another of the two or more subscription products.

8. An apparatus for provisioning subscription products comprising:
   an entitlement service module for receiving a request for a license to access a first subscription product and using the request for retrieving a user profile and at least two subscriptions associated with the user profile, wherein each of the at least two subscriptions comprises a plurality of subscription details; and
   a validation service module for validating the plurality of subscription details and for retrieving product data for the first subscription product based on the validated subscription details, determining a dominant subscription product of the at least two subscriptions associated with the user profile, wherein a second subscription product comprises a plurality of subscription products of which the first subscription product is one of the plurality of subscription products, and sending the product data for the dominant subscription product, wherein the product data enables activation of a product license, where the product license enables access to the first subscription product in addition to the plurality of subscription products in the second subscription product.

9. The apparatus of claim 8, wherein the request for a license to access a first subscription product comprises at least one of installing a new subscription product or upgrading an existing subscription product.

10. The apparatus of claim 8 wherein the request comprises a product license identification code and a user identification code.

11. The apparatus of claim 9 wherein the subscription details comprise an installer scenario key.

12. The apparatus of claim 11, wherein the installer scenario key defines a subscription product, a platform on which the subscription product will run, and a serial number.

13. The apparatus of claim 12, wherein the serial number and defined subscription product define a license that is to be activated on a client computer.

14. The apparatus of claim 8, wherein determining a dominant subscription product comprises determining which of two or more subscription products includes a greater number of one or more subscription products, wherein the subscription product that includes the greater number of one or more subscription products includes another of the two or more subscription products.

15. A non-transient computer readable medium for storing computer instructions that, when executed by at least one processor cause the at least one processor to perform a method of provisioning subscription products comprising:
   receiving a request for a license to access a first subscription product;
   retrieving a user profile and at least two subscriptions associated with the user profile, wherein each of the at least two subscriptions comprises a plurality of subscription details;
   validating the plurality of subscription details;
   retrieving product data for the first subscription product based on the validated subscription details;
   determining a dominant subscription product of the at least two subscriptions associated with the user profile, wherein a second subscription product comprises a plurality of subscription products of which the first subscription product is one of the plurality of subscription products; and
   sending the product data for the dominant subscription product, wherein the product data enables activation of a product license, where the product license enables access to the first subscription product in addition to the plurality of subscription products in the second subscription product.

16. The computer readable medium of claim 15, wherein the request comprises at least one of installing a new subscription product or upgrading an existing subscription product.

17. The computer readable medium of claim 15 wherein the request comprises a product license identification code and a user identification code.

18. The computer readable medium of claim 16 wherein the subscription details comprise an installer scenario key.

19. The computer readable medium of claim 18, wherein the installer scenario key defines a subscription product, a platform on which the subscription product will run, and a serial number, wherein the serial number and defined subscription product define a license that is to be activated on a client computer.

20. The computer readable medium of claim 15, wherein determining a dominant subscription product comprises determining which of two or more subscription products includes a greater number of one or more subscription products, wherein the subscription product that includes the greater number of one or more subscription products includes another of the two or more subscription products.

* * * * *